(12) United States Patent
Takahashi et al.

(10) Patent No.: US 7,693,786 B2
(45) Date of Patent: Apr. 6, 2010

(54) COMMUNICATION SYSTEM AND INFORMATION PROCESSING METHOD

(75) Inventors: Hideaki Takahashi, Tokyo (JP); Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1646 days.

(21) Appl. No.: 09/933,715

(22) Filed: Aug. 22, 2001

(65) Prior Publication Data

US 2002/0026444 A1    Feb. 28, 2002

(30) Foreign Application Priority Data

Aug. 23, 2000    (JP) .............................. P2000-258136

(51) Int. Cl.
 *G06Q 40/00*    (2006.01)
(52) U.S. Cl. .......................................... 705/39; 705/35
(58) Field of Classification Search .................. 705/26, 705/14, 35–40
See application file for complete search history.

(56) References Cited

U.S. PATENT DOCUMENTS

| 5,992,738 | A | * | 11/1999 | Matsumoto et al. | ......... | 235/381 |
| 6,009,412 | A | * | 12/1999 | Storey | ......... | 705/14 |
| 6,105,008 | A | * | 8/2000 | Davis et al. | ......... | 705/41 |
| 6,282,522 | B1 | * | 8/2001 | Davis et al. | ......... | 705/41 |
| 6,415,261 | B1 | * | 7/2002 | Cybul et al. | ......... | 705/14 |
| 6,549,912 | B1 | * | 4/2003 | Chen | ......... | 707/104.1 |
| 6,594,640 | B1 | * | 7/2003 | Postrel | ......... | 705/14 |

FOREIGN PATENT DOCUMENTS

| JP | 10-040430 A | 2/1998 |
| JP | 11-085862 A | 3/1999 |
| JP | 11-250353 A | 9/1999 |
| JP | 2000-132746 A | 5/2000 |
| JP | 2000-207334 A | 7/2000 |

OTHER PUBLICATIONS

Reed, Danielle, and Muchelle Higgins. "Takeoffs & Landings" Wall Street Journal. New York, NY. Sep. 24, 1999. p. W.5.*
"Citibank, Cathay Pacific launch new credit card." Business World. Manila: Jul. 7, 1999. p. 1.*
Japanese Office Action issued Oct. 20, 2009 for corresponding Japanese Application No. 2000-258136.

* cited by examiner

*Primary Examiner*—Hani Kazimi
*Assistant Examiner*—Olabode Akintola
(74) *Attorney, Agent, or Firm*—Rader, Fishman & Grauer PLLC (57) ABSTRACT

A network transaction server apparatus manages virtual world privilege information that is issued for a transaction that a user has conducted in a virtual world by manipulating a personal computer. A settlement server apparatus manages real world privilege information that is issued for a transaction that the user has conducted in a real world. In response to a request from the personal computer, the settlement server apparatus converts virtual world privilege information that is managed by the network transaction server apparatus into real world privilege information using a prescribed conversion factor.

16 Claims, 8 Drawing Sheets

COMMUNICATION SYSTEM AND INFORMATION PROCESSING METHOD

CROSS REFERENCE TO RELATED APPLICATIONS

This application claims priority under 35 U.S.C. §119 to Japanese Patent Appl. No. 2000-258136, filed on Aug. 23, 2000, the entire contents of which are hereby incorporated by reference.

BACKGROUND OF THE INVENTION

1. Field of the Invention

The present invention relates to a communication system and an information processing method that are characterized by processing that relates to privilege information (e.g., a point in consumer transaction point accumulation system) that is issued in accordance with an act such as a transaction that has been performed by a user in each of a real world and a virtual world.

2. Description of the Related Art

Conventionally, for example, when a user buys a commodity in a real world, for example, in a store, a user ID (identification information) that is stored in a credit card of the user is read by a terminal apparatus that is installed in the store and sent to a settlement server apparatus together with price information of the commodity. The settlement server apparatus performs settlement processing.

For example, in such a transaction that is conducted by a user in a real world by using a credit card, points are issued in accordance with, for example, an amount of money paid by the user. The user receives a certain service in accordance with the points that has been accumulated by him.

On the other hand, in recent years, with the spread of electronic commerce, events have increased that, for example, in a virtual world called "cyber world" provided by a server apparatus on a network a registered user selects a commodity by manipulating a home personal computer using his or her own user ID while looking at a commodity introduction picture that is provided by the server apparatus, sends the server apparatus a request for allowing him to buy the selected commodity, and the server apparatus performs related settlement processing.

In such a virtual world, as in a real world, points are issued to each registered user in accordance with his or her act in the virtual world and each user receives a certain service in accordance with the points that has been accumulated by him or her.

However, there is a problem in the art that where a user is acting in both of a real world and a virtual world, privilege information such as points that he has acquired in one world cannot be used in the other world.

SUMMARY OF THE INVENTION

The present invention has been made in view of the above problems in the art, and an object of the invention is therefore to provide a communication system and an information processing method that allow a user to use, also in the other world, privilege information that he has acquired in one of a real world and a virtual world in a case where privilege information is issued in accordance with an act that is performed by him in each world.

To attain the above object by solving the above problems in the art, a first aspect of the invention provides a communication system comprising a first management apparatus for managing first privilege information generated in accordance with a transaction that is conducted by a user via a network in a virtual world and first identification information to be used for identifying the user in such a manner that they are correlated with each other; and a second management apparatus for managing second privilege information that is generated in accordance with a transaction conducted by the user in a real world and second identification information to be used for identifying the user in such a manner that they are correlated with each other, wherein at least one of the first management apparatus and the second management apparatus converts the first or second privilege information that is managed by the other into privilege information to be managed by itself, and manages the privilege information obtained by the conversion.

A second aspect of the invention provides an information processing method comprising the steps of managing first privilege information generated in accordance with a transaction that is conducted by a user via a network in a virtual world by manipulating a terminal apparatus and first identification information to be used for identifying the user in such a manner that they are correlated with each other; and managing second privilege information generated in accordance with a transaction that is conducted by the user in a real world and second identification information to be used for identifying the user in such a manner that they are correlated with each other, converting, by at least one of a first management apparatus and a second management apparatus, the first or second privilege information that is managed by the other into privilege information to be managed by itself, and managing the privilege information obtained by the conversion.

DESCRIPTION OF THE PREFERRED EMBODIMENT

A communication system according to an embodiment of the present invention will be hereinafter described.

Figure 1:
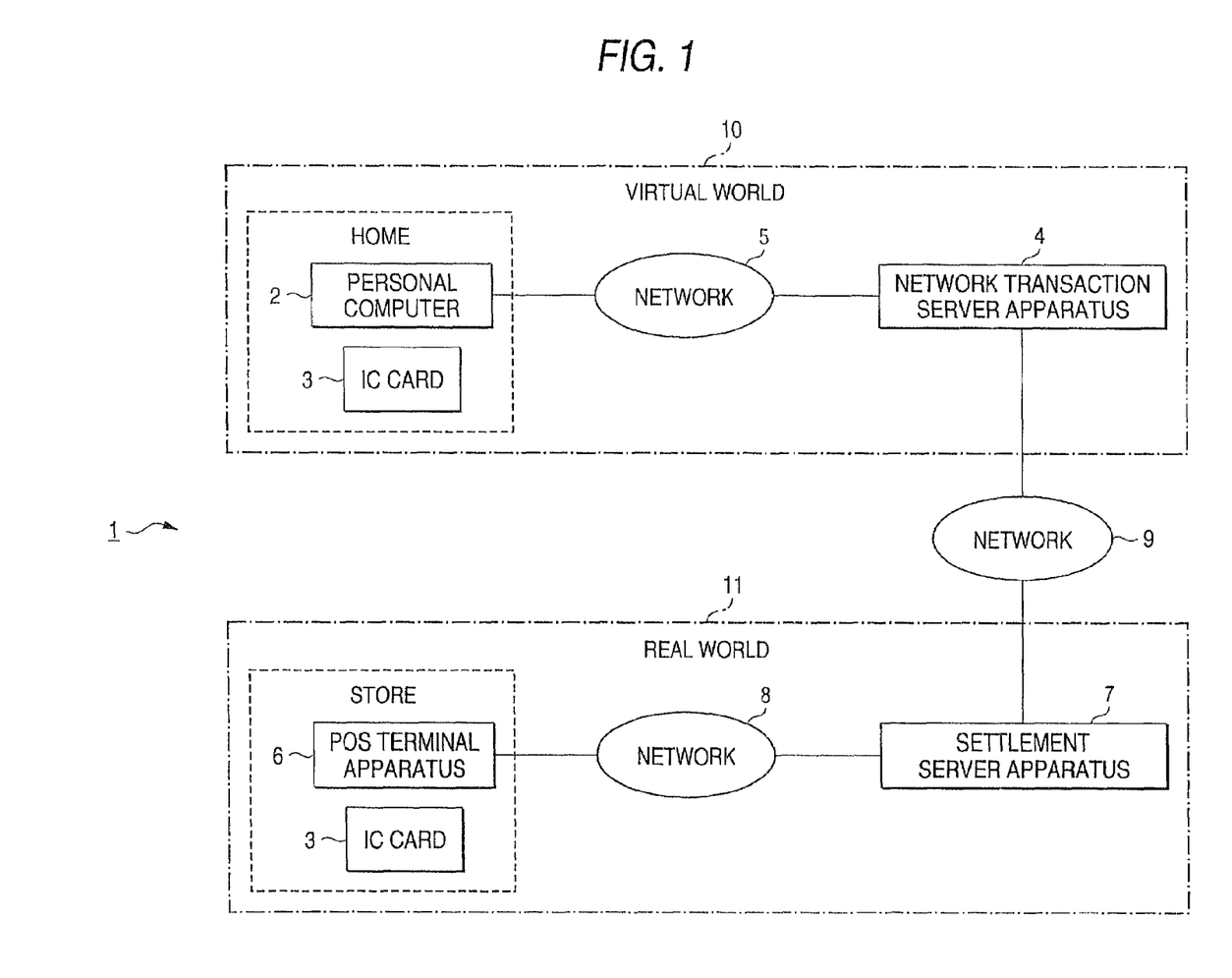
FIG. 1 shows the entire configuration of a communication system according to an embodiment of the present invention.

FIG. 1 shows the entire configuration of a communication system 1 according to the embodiment.

As shown in FIG. 1, in the communication system 1, a personal computer 2 and a network transaction server apparatus 4 are connected to each other via a network 5, a POS (point of sale) terminal apparatus 6 and a settlement server apparatus 7 are connected to each other via a network 8, and the network transaction server apparatus 4 and the settlement server apparatus 7 are connected to each other via a network 9.

For example, the personal computer 2, the network 5, and the network transaction server apparatus 4 realize commerce in a virtual world 10 such as a cyber net. The POS terminal apparatus 6, the network 8, and the settlement server apparatus 7 realize commerce in a real world 11.

The network transaction server apparatus 4 and the settlement server apparatus 7 correspond to the first management apparatus and the second management apparatus, respectively, in the invention.

The individual components of the communication system 1 will be described below.

<Personal Computer 2>

Figure 2:
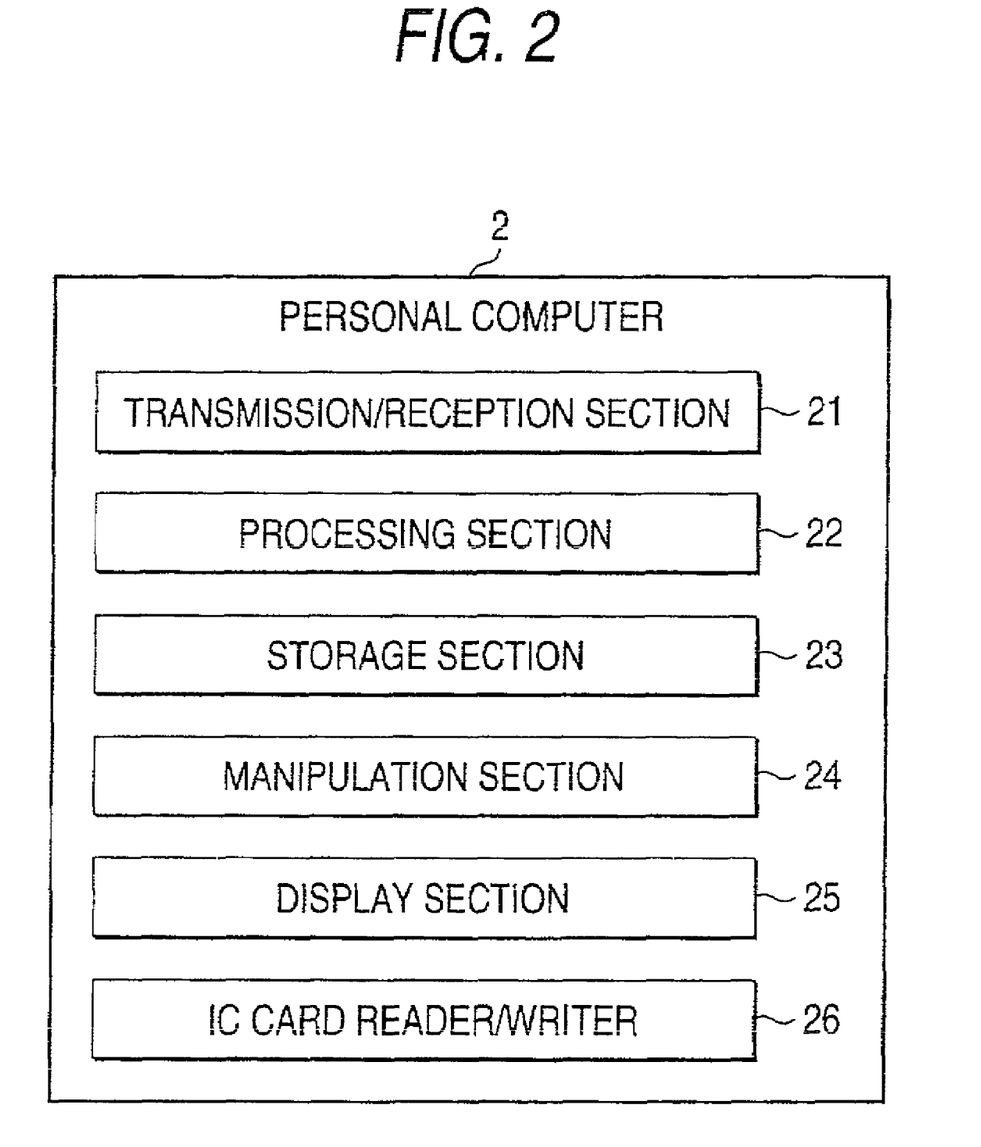
FIG. 2 is a functional block diagram of a personal computer shown in FIG. 1.

FIG. 2 is a functional block diagram of the personal computer 2.

For example, the personal computer 2, which is installed in a user's home, has a transmission/reception section 21, a processing section 22, a storage section 23, a manipulation section 24, a display section 25, and an IC card reader/writer 26 as shown in FIG. 2.

The transmission/reception section 21 sends and receives a request or information to and from the network transaction server apparatus 4 via the network 5 (see FIG. 1).

The processing section 22 performs prescribed processing (described later) in accordance with a manipulation signal that is input through the manipulation section 24 or a request or information that is received from the network transaction server apparatus 4.

The storage section 23 stores various kinds of information that are necessary for processing of the personal computer 2.

The manipulation section 24 generates a manipulation signal in accordance with a manipulation that is performed by the user by using a mouse, a keyboard, or the like, and outputs it to the processing section 22.

The display section 25 displays a picture corresponding to a display signal that is input from the processing section 22.

The IC card reader/writer 26 writes and reads information to and from an IC card 3 under the control of the processing section 22.

The personal computer 2 receives an image signal of a picture that introduces commodities etc. from the network transaction server apparatus 4 in accordance with a manipulation that is performed by the user through the manipulation section 24, and displays the picture on the display section 25.

The personal computer 2 sends a commodity buying request of a commodity that has been specified by the user to the network transaction server apparatus 4 via the network 5.

The personal computer 2 reads a user ID from the IC card 3 of the user using the IC card reader/writer 26 shown in FIG. 2, and sends the user ID and a price to the network transaction server apparatus 4. The network transaction server apparatus 4 performs settlement processing based on the user ID and the price that are received from the personal computer 2.

The commodity as a subject of the commodity buying request of the user is delivered to the user by a related company by mail, for example.

<IC Card 3>

The IC card 3 stores the user ID, for example, of the user as the owner of the IC card 3. A transaction that is accompanied by settlement etc. is conducted by using the user ID in both of the virtual world 10 and the real world 11.

The IC card 3 can be used for not only applications using the user ID but also other various applications such as a digital cash application.

It is possible to write and read information to and from the IC card 3 by a non-contact method, for example.

<Network Transaction Server Apparatus 4>

The network transaction server apparatus 4 is a server apparatus that performs processing relating to an electronic commerce act that is performed by the user via the network 5 by using the personal computer 2 of FIG. 2.

Figure 3:
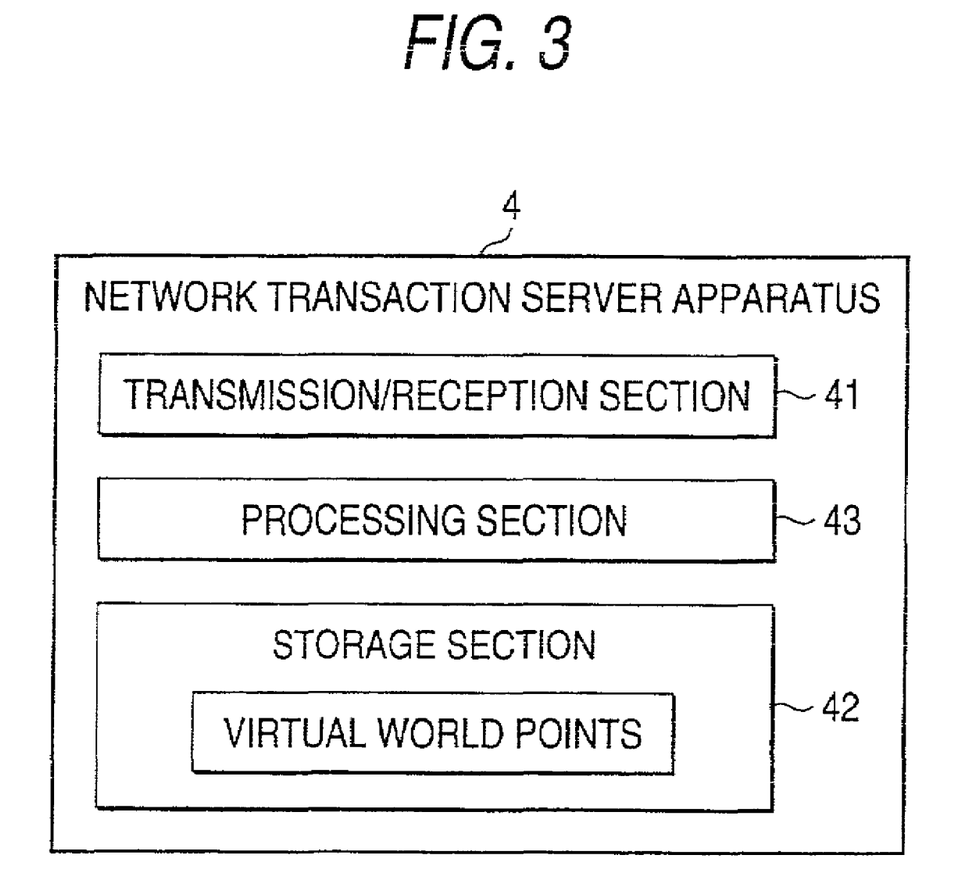
FIG. 3 is a functional block diagram of a network transaction server apparatus shown in FIG. 1

FIG. 3 is a functional block diagram of the network transaction server apparatus 4.

As shown in FIG. 3, the network transaction server apparatus 4 has, for example, a transmission/reception section 41, a storage section 42, and a processing section 43.

The transmission/reception section 41 not only sends and receives a request or information to and from the personal computer 2 via the network 5, but also sends and receives a request or information to and from the settlement server apparatus 7 via the network 9.

The storage section 42 stores a user ID, a password, and personal information of each registered user who owns an IC card 3.

The storage section 42 stores history information of manipulations and procedures that have been performed or followed by each user and virtual world privilege information (the first privilege information in the invention; e.g., a point) that has been issued to him in accordance with transactions conducted by him in the virtual world 10 in such a manner that they are correlated with his user ID.

The virtual world privilege information is information that is issued in accordance with an act performed by each user in the virtual world 10 and that is used for judging his credibility or contribution to the virtual world 10. In accordance with virtual world privilege information that each user has acquired, an upper amount of money he is allowed to use in the virtual world 10 is set or he is given a certain profit such as digital cash or a discount from a commodity price.

Privilege information that is issued to each user may be determined in accordance with the number of times of transmission, the frequency of transmission, or the like.

The processing section 43 reads virtual world privilege information from the storage section 42 and sends it to the settlement server apparatus 7 in response to virtual world privilege information request from the settlement server apparatus 7.

Further, the processing section 43 performs the following processing in response to a request from the personal computer 2.

Figure 4:
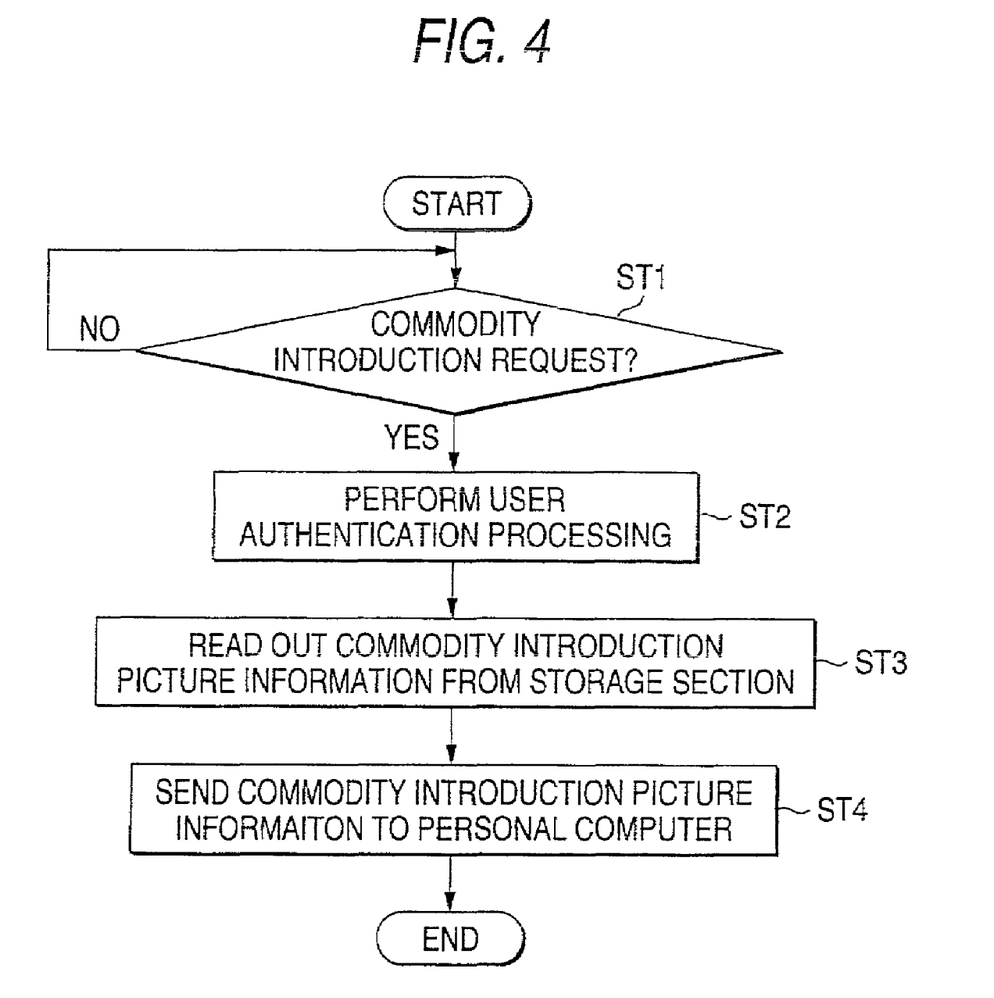
FIG. 4 is a flowchart showing a process that is executed by a processing section shown in FIG. 3 when it receives a commodity introduction request from the personal computer shown in FIG. 1.

First, a description will be made of processing of the processing section 4 that is performed when it receives a commodity introduction request from the personal computer 2. FIG. 4 is a flowchart of this process.

Step ST1: If judging that the transmission/reception section 41 has received a commodity introduction request from the personal computer 2, the processing section 43 moves to step ST2. If judging otherwise, the processing section 43 executes step ST1 repeatedly.

Step ST2: Using a user ID, a password, etc. that are received from the personal computer 2 and information of the user that is stored in the storage section 42, the processing section 43 performs user authentication processing in which whether the user is a legitimate user who is registered is judged. If the legitimacy of the user is confirmed, the processing section 43 moves to step ST3.

Step ST3: The processing section 43 reads commodity introduction picture information from the storage section 42.

Step ST4: The processing section 43 sends the commodity introduction picture information that was read out at step ST3 to the personal computer 2 via the transmission/reception section 41.

Figure 5:
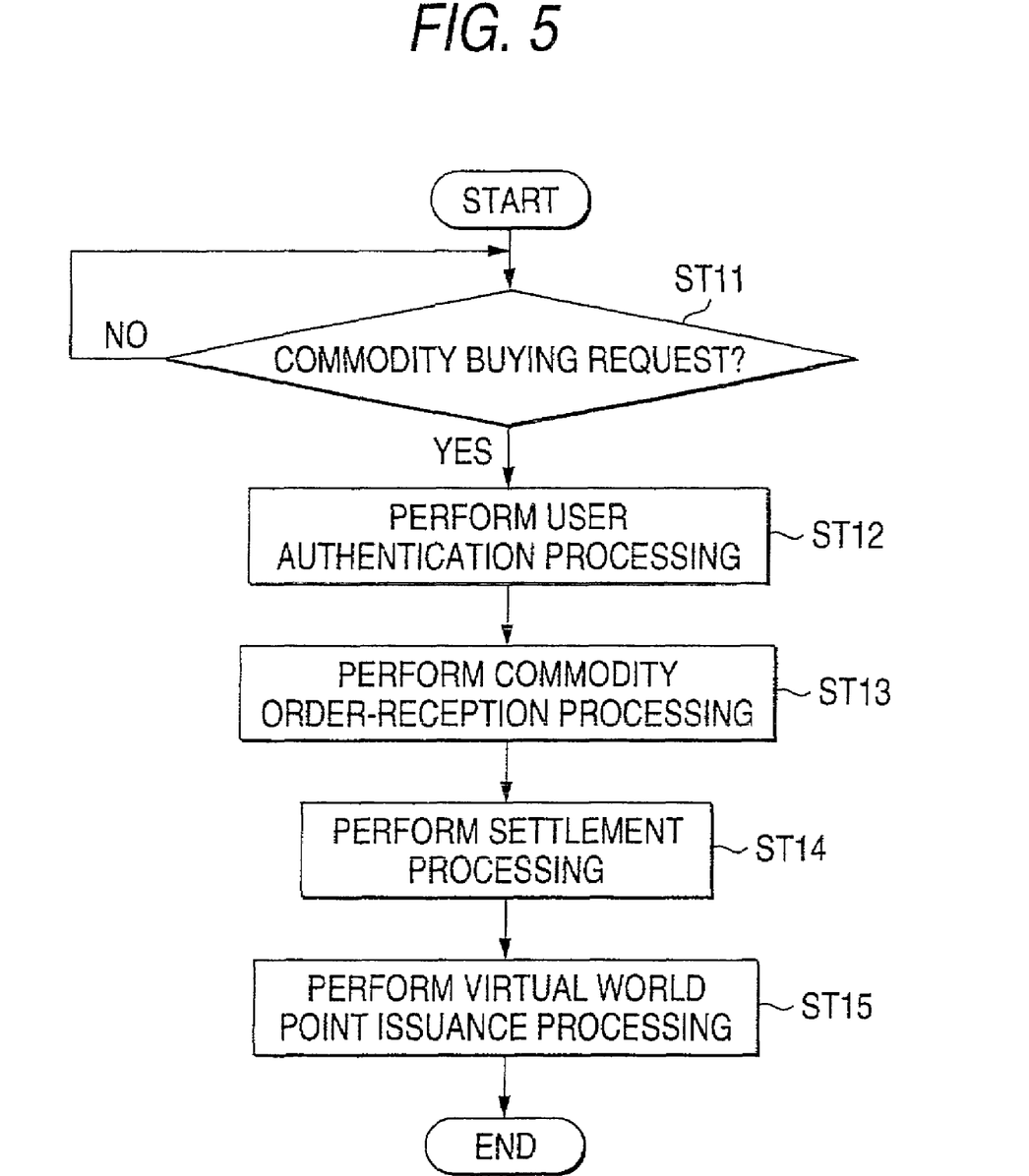
FIG. 5 is a flowchart showing a process that is executed by the processing section shown in FIG. 3 when it receives a commodity buying request from the personal computer 2 shown in FIG. 1.

Next, a description will be made of processing of the processing section 43 that is performed when it receives a commodity buying request from the personal computer 2. FIG. 5 is a flowchart of this process.

Step ST11: If judging that the transmission/reception section 41 has received a commodity buying request from the personal computer 2, the processing section 43 moves to step ST12. If judging otherwise, the processing section 43 executes step ST11 repeatedly.

Step ST12: Using a user ID, a password, etc. that are received from the personal computer 2 and information of the user that is stored in the storage section 42, the processing section 43 performs user authentication processing in which whether the user is a legitimate user who is registered is judged. If the legitimacy of the user is confirmed, the processing section 43 moves to step ST13.

Step ST13: The processing section 43 performs order-reception processing for the user's order of a commodity that is indicated by the commodity buying request that was received at step ST11. Specifically, the processing section 43 writes such information as the type, the number of pieces, a delivery destination, etc. of the ordered commodity to the storage section 42.

Step ST14: The processing section 43 performs settlement processing about the buying of the commodity concerned for the user who issued the commodity buying request that was received at step ST11.

Step ST15: The processing section 43 issues virtual world privilege information for the buying of the commodity concerned by the user according to predetermined standards, adds the issued virtual world privilege information to total virtual world privilege information that the user has acquired so far, and writes updated total virtual world privilege information to the storage section 42. At this time, the processing section 43 issues virtual world privilege information in accordance with the amount of money settled.

<POS Terminal Apparatus 6>

Figure 6:
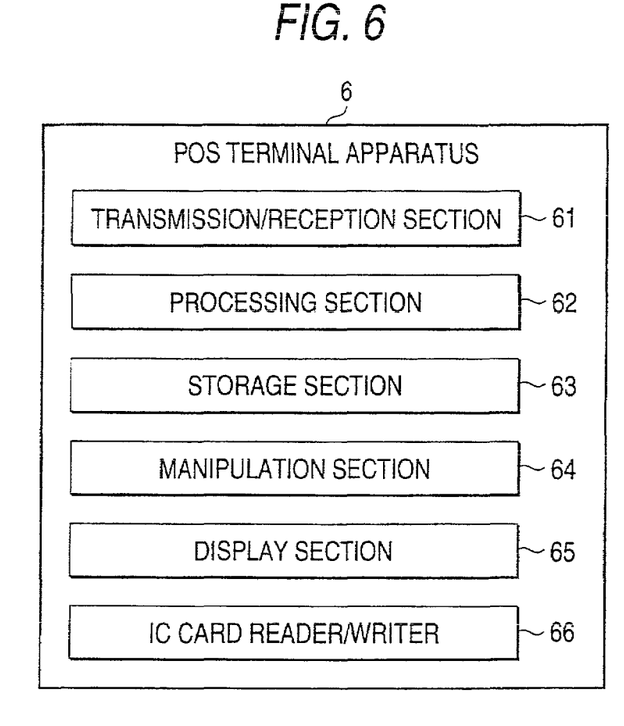
FIG. 6 is a functional block diagram of a POS terminal apparatus shown in FIG. 1.

FIG. 6 is a functional block diagram of the POS terminal apparatus 6.

The POS terminal apparatus 6, which is installed in a store or the like, has, for example, a transmission/reception section 61, a processing section 62, a storage section 63, a manipulation section 64, a display section 65, and an IC card reader/writer 66 as shown in FIG. 6.

The transmission/reception section 61 sends and receives a request or information to and from the settlement server apparatus 7 via the network 8 (see FIG. 1).

The processing section 62 performs prescribed processing in accordance with a manipulation signal that is input through is received from the settlement server apparatus 7.

The storage section 63 stores various kinds of information that are necessary for processing of the POS terminal apparatus 6.

The manipulation section 64 generates a manipulation signal in accordance with a manipulation that is performed by a store clerk or the like by using a mouse, a keyboard, or the like, and outputs it to the processing section 62.

The display section 65 displays a picture corresponding to a display signal that is input from the processing section 62.

The IC card reader/writer 66 writes and reads information to and from an IC card 3 under the control of the processing section 62.

When a user buys a commodity in the store, the POS terminal apparatus 6 performs input of a price, causes the IC card reader/writer 66 to read a user ID from an IC card 3, and performs other operation in accordance with manipulations on the manipulation section 64 by a clerk or the like and sends a settlement request including the price and the user ID to the settlement server apparatus 7 via the transmission/reception section 61.

Further, the POS terminal apparatus 6 receives an authentication result indicating whether the IC card 3 is a displays it on the display section 65.

<Settlement Server Apparatus 7>

The settlement server apparatus 7 is a server apparatus that performs, using an IC card 3, settlement about, for example, a user's buying of a commodity in a store.

Figure 7:
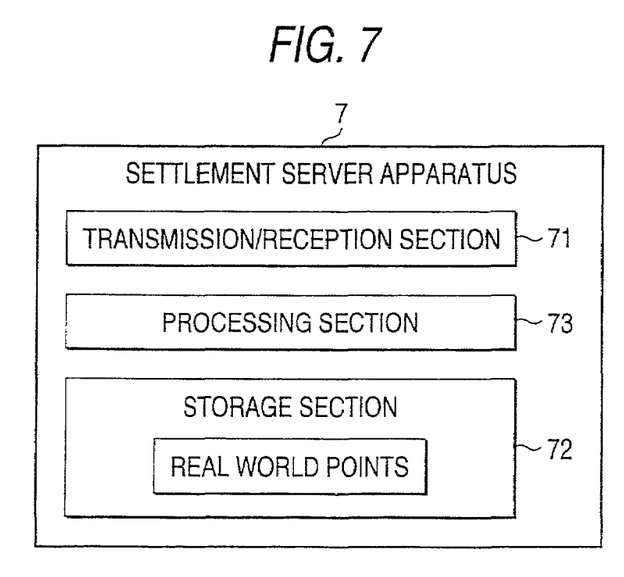
FIG. 7 is a functional block diagram of a settlement server apparatus shown in FIG. 1.

FIG. 7 is a functional block diagram of the settlement server apparatus 7.

As shown in FIG. 7, the settlement server apparatus 7 has a transmission/reception section 71, a storage section 72, and a processing section 73.

The transmission/reception section 71 not only sends and receives a request or information to and from the POS terminal apparatus 6 via the network 8, but also sends and receives a request or information to and from the network transaction server apparatus 4 via the network 9.

The storage section 72 stores a user ID, a password, and personal information of each registered user who owns an IC card 3.

The storage section 72 stores real world privilege information (the second privilege information in the invention; e.g., a point) that has been issued to a user in accordance with transactions conducted by him in the real world 11 in such a manner that it is correlated with his user ID.

The real world privilege information is information that is issued in accordance with an act performed by each user in the real world 11 and that is used for judging his credibility or contribution to the real world 11. In accordance with real world privilege information that each user has acquired, an upper amount of money he is allowed to use in the real world 11 is set or he is given a certain profit such as digital cash or a discount from a commodity price.

The storage section 72 stores a conversion factor that is used in converting virtual world privilege information into real world privilege information.

The processing section 73 performs the following processing in accordance with a request from the POS terminal apparatus 6 or the personal computer 2.

Figure 8:
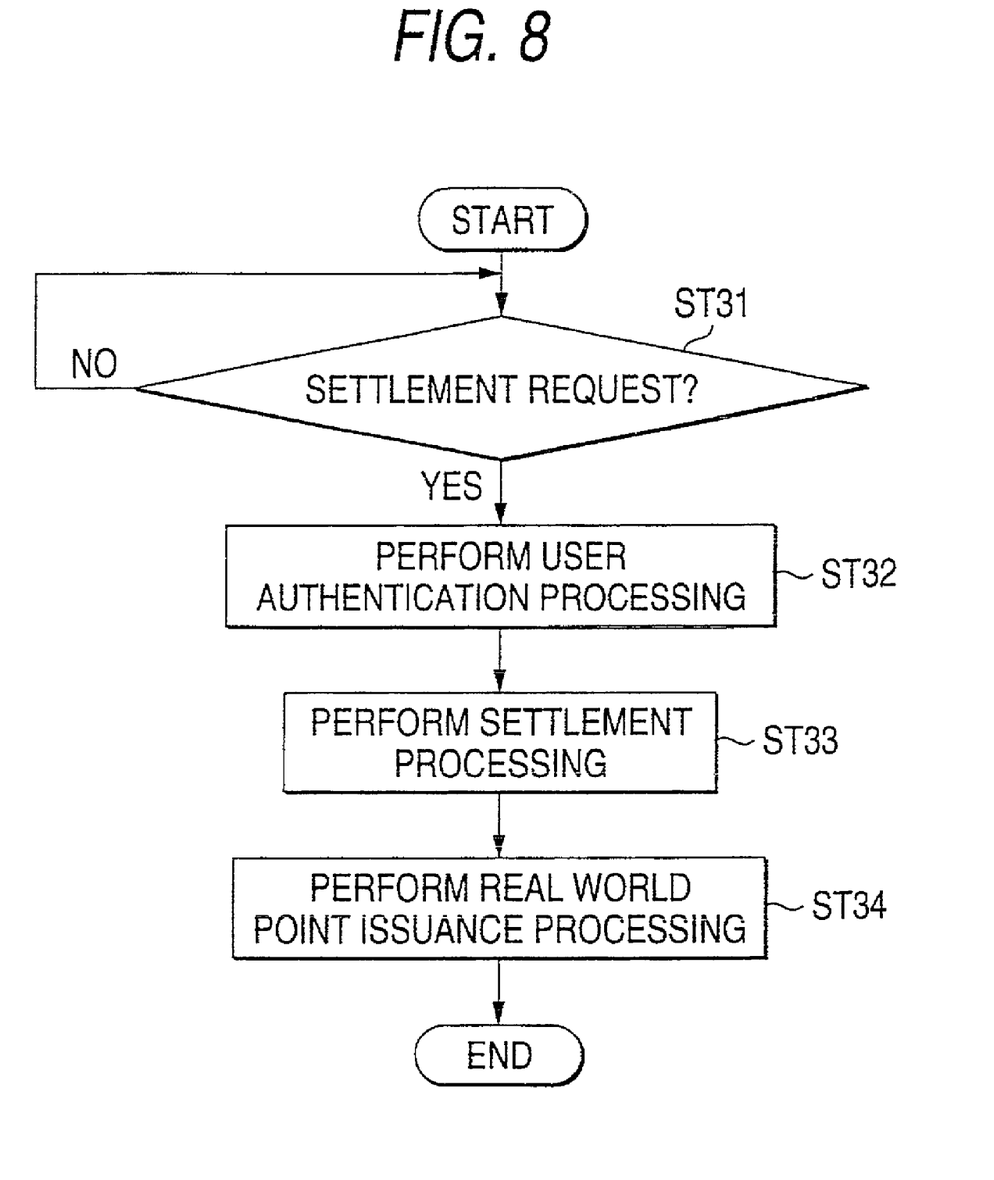
FIG. 8 is a flowchart showing a process that is executed by a processing section of the settlement server apparatus shown in FIG. 7 when it receives a settlement request from the POS terminal apparatus shown in FIG. 1.

First, a description will be made of processing of the processing section 73 that is performed when it receives a settlement request from the POS terminal 6. FIG. 8 is a flowchart of this process.

Step ST31: If judging that the transmission/reception section 71 has received a settlement request from the POS terminal apparatus 6, the processing section 73 moves to step ST32. If judging otherwise, the processing section 73 executes step ST31 repeatedly.

Step ST32: Using a user ID that is received from the POS terminal apparatus 6 and information of the user that is stored in the storage section 72, the processing section 73 performs user authentication processing in which whether the user is a legitimate user who is registered is judged. If the legitimacy of the user is confirmed, the processing section 73 moves to step ST33.

Step ST33: The processing section 73 performs settlement processing for the user using the user ID and price information that have been received from the POS terminal apparatus 6.

Step ST34: The processing section 73 issues real world privilege information for the settlement for the user according to predetermined standards, adds the issued real world privilege information to total real world privilege information that the user has acquired so far, and writes updated total real world privilege information to the storage section 72. At this time, the processing section 73 issues real world privilege information in accordance with the amount of money settled.

Figure 9:
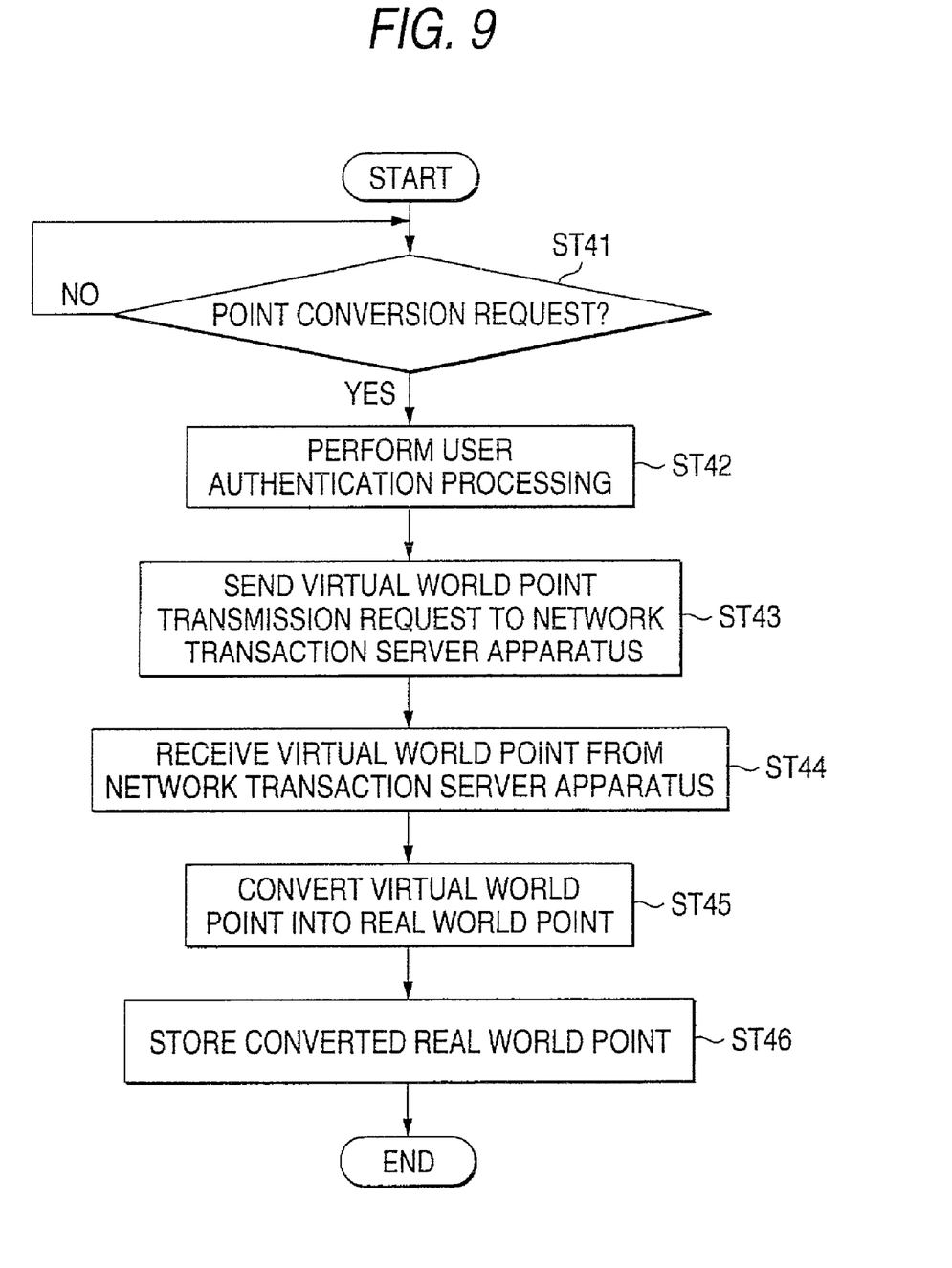
FIG. 9 is a flowchart showing a process that is executed by the processing section of the settlement server apparatus shown in FIG. 7 when it receives a privilege information conversion request from the personal computer via the network transaction server apparatus shown in FIG. 1.

Next, a description will be made of processing that is performed by the processing section 73 when it receives a privilege information conversion request from the personal computer 2 via the network transaction server apparatus 4. FIG. 9 is a flowchart of this process.

Step ST41: If judging that the transmission/reception section 71 has received a privilege information conversion request from the personal computer 2, the processing section 73 moves to step ST42. If judging otherwise, the processing section 73 executes step ST41 repeatedly.

Step ST42: Using a user ID that is received from the personal computer 2 and information of the user that is stored in the storage section 72, the processing section 73 performs user authentication processing in which whether the user is a legitimate user who is registered is judged. If the legitimacy of the user is confirmed, the processing section 73 moves to step ST43.

Step ST43: The processing section 73 sends the network transaction server apparatus 4 a virtual world privilege information transmission request that requests transmission of virtual world privilege information of the user.

Step ST44: The processing section 73 receives virtual world privilege information of the user from the network transaction server apparatus 4.

Step ST45: The processing section 73 converts the virtual world privilege information that was received at step ST44 into real world privilege information using the predetermined conversion factor that is read from the storage section 72.

Step ST46: The processing section 73 adds the real world privilege information that was obtained by the conversion at step ST45 to real world privilege information that the user has acquired so far, and stores updated real world privilege information in the storage section 72.

As described above, in the communication system 1, virtual world privilege information that a user has acquired in accordance with acts that he has performed in the virtual world 10 is converted into real world privilege information in response to a request from him. Therefore, the user can cause a service that is provided by the settlement server apparatus 7 or the like to him in the real world 11 in accordance with his credibility or contribution to reflect his credibility or position that he has acquired in accordance with acts that he has performed in the virtual world 10.

The invention is not limited to the above embodiment.

In the embodiment, virtual world privilege information that a user has acquired in the virtual world 10 is converted, in response to a request from him, into real world privilege information that is used in the real world 11. Conversely, real world privilege information that a user has acquired in the real world 11 may be converted, in response to a request from him, into virtual world privilege information that is used in the virtual world 10.

In the embodiment, virtual world privilege information is stored in the network transaction server apparatus 4 and real world privilege information is stored in the settlement server apparatus 7. However, at least one of virtual world privilege information and real world privilege information may be stored in the built-in memory of the IC card 3.

As described above, the invention can provide a communication system and an information processing method that allow a user to use, also in the other world, privilege information that he or she has acquired in one of a virtual world and a real world in a case where privilege information is issued in accordance with an act that is performed by him or her in each world.

The privilege information allows a customer/user to obtain incentive, such as an addable point, an amount of money corresponding to an upper limit service that a user can receive such as an upper limit usable amount of money of a card, and an electronic value that can be replenished and used such as a digital cash.

What is claimed is:

1. A communication system comprising:
    a first management apparatus for managing and settling a first transaction and generating a first privilege information generated in accordance with the first transaction, the first transaction being a virtual transaction, the virtual transaction being a transaction conducted between the first management apparatus and a user terminal, located at a remote location, without a point-of-sale terminal via a network using a user identifier that identifies the user in such a manner that the first privilege information and the user identifier are correlated with each other,
    wherein the user identifier is stored in an IC card and uniquely associates the user to the IC card, and the first transaction is made using the IC card in conjunction with the user terminal; and
    a second management apparatus for managing and settling a second transaction and generating a second privilege information that is generated in accordance with the second transaction, the second transaction being a real world transaction, the real world transaction being a transaction conducted between the second management apparatus and the user via a point-of-sale terminal, and using the user identifier in such a manner that the second privilege information and the user identifier are correlated with each other,
    wherein the second transaction includes a settlement processing based on the user identifier and a price, and is also made using the IC card in conjunction with the point-of-sale terminal, and
    wherein the second management apparatus converts the first privilege information that is managed by the first management apparatus into privilege information managed by the second management apparatus according to a prescribed conversion factor, and manages the privilege information obtained by the result of the conversion, such that the first privilege information is converted to the second privilege information and added to a total of the second privilege information for the user in response to a request from the user terminal to the second management apparatus to convert the first privilege information to the second privilege information.

2. The communication system according to claim 1, wherein at least one of the first privilege information and the second privilege information is an addable point.

3. The communication system according to claim 1, wherein at least one.

4. The communication system according to claim 1, wherein the first privilege information and the second privilege information are the same type of information.

5. The communication system according to claim 1, wherein the second management apparatus performs settlement processing in response to a settlement request about a transaction that the user has conducted.

6. The communication system according to claim 2, wherein at least one of the first management apparatus and the second management apparatus performs the processing of issuing the point.

7. The communication system according to claim 1, wherein the first management apparatus provides the first privilege information in accordance with a credibility of the user or a contribution by the user in the virtual world.

8. The communication system according to claim 1, wherein the second management apparatus provides the second privilege information in accordance with a credibility of the user or a contribution by the user in the real world.

9. The communication system of claim 1, wherein the request from the user terminal, to the second management apparatus to convert the first privilege information to the second privilege information, is made subsequent to the first transaction and second transaction.

10. An information processing method comprising the steps of:
managing and settling a first transaction, the first transaction being a virtual transaction, the virtual transaction being a transaction between a first management apparatus and a user terminal via a network, the user terminal, located at a remote location, without a point-of-sale terminal;
generating a first privileges information generated in accordance with the first transaction using a user identifier that identifies the user in such a manner that the first privilege information and the user identifier are correlated with each other, wherein the user identifier is stored in an IC card and uniquely associates the user to the IC card, and the first transaction is made using the IC card in conjunction with the user terminal;
managing and settling a second transaction in a virtual world between the user and a second management apparatus;
generating a second privilege information generated in accordance with the second transaction, the second transaction being a real world transaction, the real world transaction being a transaction conducted between the second management apparatus and the user via a point-of-sale terminal using the user identifier to identify the user in such a manner that the second privilege information and the user identifier are correlated with each other, wherein the second transaction includes a settlement processing based on the user identifier and a price, and is also made using the IC card in conjunction with the point-of-sale terminal; and
converting, by at least one of a first management apparatus and a second management apparatus, the first privilege information into second privilege information to be managed by the second management information apparatus according to a prescribed conversion factor and managing the privilege information obtained by the results of the conversion, such that the first privilege information is converted to the second privilege information and added to a total of the second privilege information for the user in response to a request from the user terminal to the second management apparatus to convert the first privilege information to the second privilege information.

11. The information processing method according to claim 10, wherein the first privilege information and the second privilege information are the same type of information.

12. The information processing method according to claim 10, wherein at least one of the first privilege information and the second privilege information is an addable point.

13. The information processing method according to claim 10, wherein the first management apparatus provides the first privilege information in accordance with a credibility of the user or a contribution by the user in the virtual world.

14. The information processing method according to claim 10, wherein the second management apparatus provides the second privilege information in accordance with a credibility of the user or a contribution by the user in the real world.

15. The information processing method of claim 10, wherein the request from the user terminal, to the second management apparatus to convert the first privilege information to the second privilege information, is made subsequent to from the first transaction and second transaction.

16. A communication system comprising:
a first management apparatus for managing and settling an internet transaction and generating a first privilege information generated based on an internet transaction, the internet transaction being a transaction conducted between the first management apparatus and a user's personal terminal device, located at a remote location from the first management apparatus, via a network using a user identifier that associates the first privilege information with the user, the user identifier being stored in an IC card, and the first transaction is made using the IC card in conjunction with the user's personal terminal device;
a second management apparatus for managing and settling a point-of-sale transaction and generating a second privilege information that is generated based on the point-of-sale transaction, the point-of-sale transaction being a transaction conducted between the second management apparatus and the user via a point-of-sale terminal, and using the user identifier to associate the second privilege information with the user, the point-of-sale transaction being settled using the user identifier and a price, and is also made using the IC card in conjunction at the point-of-sale terminal, and
wherein the second management apparatus converts the first privilege information into second privilege information using a conversion factor and adds the converted privilege information to a total second privilege information for the user, in response to a request from the user's personal terminal device to the second management apparatus to convert the first privilege information to the second privilege information, the request being unique and separate from the first transaction and second transaction.

* * * * *